Sept. 15, 1953      E. SCHLUETER      2,651,907
WEED CUTTER
Filed Jan. 6, 1951
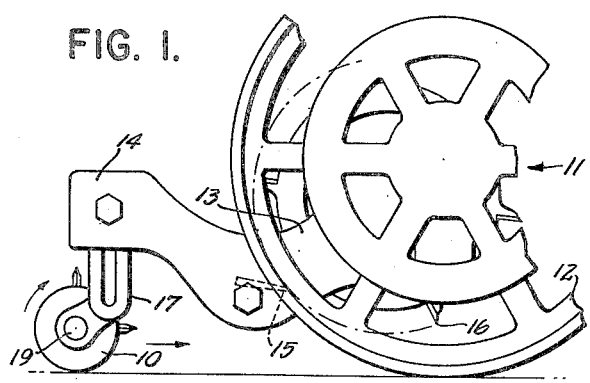
FIG. 1.
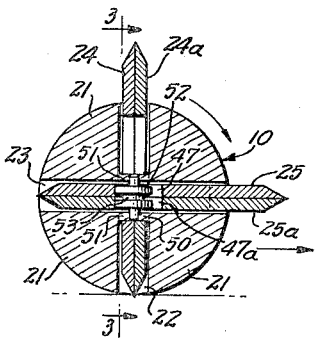
FIG. 2.
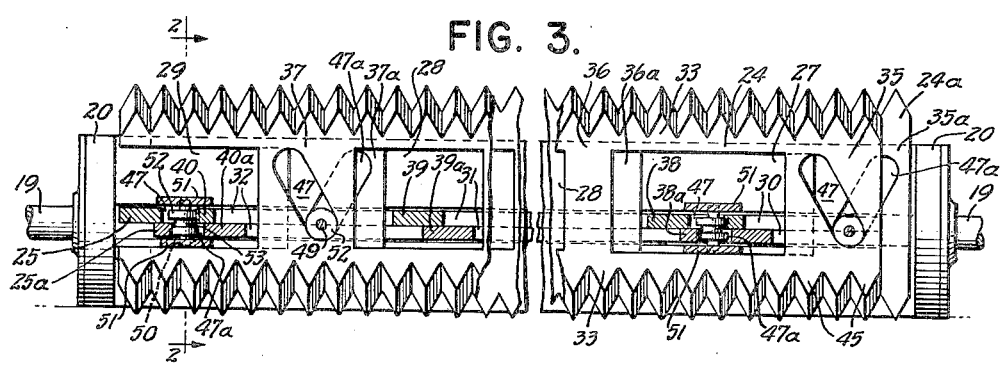
FIG. 3.
FIG. 8.      FIG. 4.
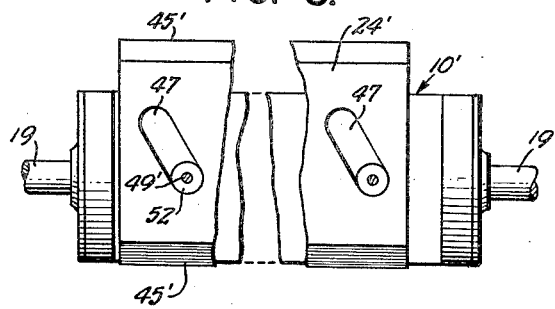
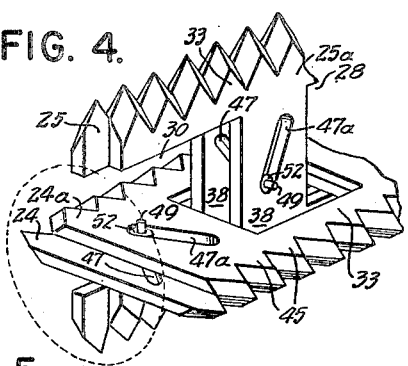
FIG. 5.    FIG. 6.   FIG. 7.
FIG. 9
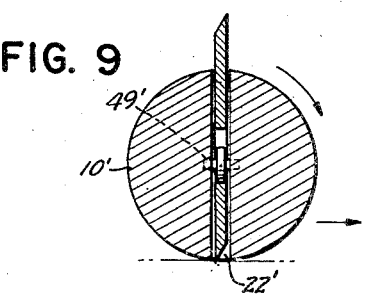
Inventor
ERNEST SCHLUETER
By H. M. Kilpatrick
Attorney Patented Sept. 15, 1953

2,651,907

UNITED STATES PATENT OFFICE 2,651,907

WEED CUTTER

Ernest Schlueter, Troy, N. Y.

Application January 6, 1951, Serial No. 204,702

4 Claims. (Cl. 56—257)

This invention relates to cutting devices, and devices for cutting weeds and like objects and more particularly to devices for cutting weeds on a lawn and for devices that may be attached to lawn mowers or other traveling structures, though it is noted that in some of the claims the invention is not limited to weed cutters.

Objects of the invention are to provide an improved device of this kind for utilizing the ground as a backing to hold the weeds while being cut, and for cutting weeds on a lawn without disfiguring the grass.

Other objects of the invention are to provide an improved cutter of this kind which will flatten the weed on the ground and cut the weed with a scissor's action or with a shearing action.

Additional objects of the invention are to effect simplicity and efficiency in such cutting apparatus and to provide an extremely simple apparatus of this kind which is rapid, efficient, thorough, durable, and reliable in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a traveling structure on which is rotatably mounted a ground roller having intersecting longitudinal guide ways extending substantially through the roller, in which are disposed pairs of longitudinal blades wider than the roller is thick and slidable face-to-face in the respective guide ways and provided with serrated side edges and large intramarginal openings and wide webs therebetween passing through the openings of the other pair. Non-adjacent webs of each blade adjacent to webs of the same pair of blades are provided with diagonal slots, the slots of each blade being inclined in the same direction, adjacent slots of different blades crossing each other and being inclined in opposite direction. A shaft passing through each pair of crossed slots and having projecting ends rotatable in bearing blocks fast in guide ways at said ends are provided with rollers rotary on each short shaft one in each associated slot, whereby when the ground roller is rolled to bring a projected serrated edge to the ground, the projected edge is engaged by the ground and forced toward and into the guide way, causing relative longitudinal sliding of the engaged edges, causing adjacent serrated cutting edges to move across each other and cut weeds rolled upon by the roller.

In one form of the invention only one blade is shown, and its cutting edges are unserrated.

In the accompanying drawing showing, by way of example, two of many possible embodiments of the invention, Fig. 1 is a fragmental side elevation showing a portion of a lawn mower with my weed cutting roller attached;

Fig. 2 shows an enlarged section of the roller taken on the line 2—2 of Fig. 3;

Fig. 3 is a fragmental side elevation partly in section on the line 3—3 of Fig. 2;

Fig. 4 is a fragmental perspective view showing parts of intersecting blades;

Fig. 5 is an enlarged fragmental side elevation showing a tooth of the serrated blade;

Figs. 6 and 7 are sections on the line 6—6 of Fig. 5, showing blade teeth in different positions;

Fig. 8 is a fragmental side elevation, parts being removed or in section, showing a simplified form of the invention; and Fig. 9 is a transverse section of the form of Fig. 8.

Any convenient means may be provided for rolling my improved weed-cutting roller 10 on the ground, the roller here being shown attached to a conventional lawn mower fragmentarily shown at 11 (Fig. 1) and comprising drive wheels 12, rotary cutters 16, side frame members 13 having rear extensions 14, and a stationary cutter 15 thereon cooperating with the rotary cutter 16 to cut grass. Vertically adjustable brackets 17 are carried on said extensions 14, and the roller 10 has end journals 19 rotary in said brackets.

The weed-cutting roller 10 may be one-piece die cast or built of end disks 20 (Fig. 3) coaxially fast on the journals, and longitudinal quarter-cylindrical segment 21 (Fig. 2) welded fast to the end disks and substantially forming a cylinder and intersecting longitudinal diametrical guide ways 22, 23 extending substantially through the axis of the roller to the periphery of the roller and the end disks 20 and forming closely spaced parallel side walls.

Pairs of longitudinal blades 24, 24a and 25, 25a nearly as long as said guide ways, each of a width somewhat greater than the diameter of the roller, are slidably disposed face-to-face in the respective guide ways and provided with large intramarginal openings 27, 28, 29 and 30, 31, 32 leaving cutting margins 33 at both edges of the blades, and wide webs 35, 35a, 36, 36a, 37, 37a and 38, 38a, 39, 39a, 40, 40a connecting said margins, the webs of one pair of blades passing through the openings of the other pair of blades, whereby the planes of each pair intersect the planes of the other pair. For instance, the webs 35, 35a pass through the openings 30; the webs 37, 37a pass through the openings 32; the webs 38, 38a pass through the openings 27; and the webs 40, 40a pass through the openings 29.

Each edge or cutting margin 33 of each blade is provided throughout with adjacent outwardly pointed laterally beveled cutting teeth 45 having side cutting edges 46 (Figs. 5 to 7) adjacent to the plane of contact of the adjacent blades.

Non-adjacent webs 35, 37 or 38, 40 of each blade are adjacent to similar webs 35a, 37a or 38a, 40a of the same pair and are provided with diagonal slots, the slots of each blade 47 being inclined in the same direction, adjacent slots 47, 47a crossing each other and being inclined in opposite directions relative to the adjacent diameter of the roller. For instance webs 35 and 37 are provided with slots 47 inclined in the same direction, while slots 47 are inclined in opposite directions from the slots 47a.

A short shaft 49 (Fig. 4) passes through and projects from each pair of crossed slots 47, 47a and has projecting ends in rotary bores 50 Fig. 2 and left of Fig. 3 of bearing blocks 51 integral or welded fast in the guide ways at the ends of the short shafts, the blocks being disposed in the large openings 27, 29 receiving the slot-carrying webs and provided with the crossed slots receiving said shafts. Anti-friction rollers 52 rotary on each short shaft are disposed in the respective associated slots and separated by washers 53.

The length and width of the blades 24, 24a, 25, 25a, the length and position of the slots 47, 47a and the position and size of the anti-friction rollers 52 are such that when the rollers are in either end of the slots, the most adjacent teeth 45 are housed in the associated guide way and the opposite cutting margins are projected, whereby when the ground roller 10 is rolled to bring the projected cutting margins 33 to the ground the projected margins are engaged by the ground and forced toward and into their guide way, causing relative longitudinal sliding of the ground-engaged margins in opposite directions, causing adjacent cutting edges 46 to move across each other and cut with a scissor's action, weeds, which have been flattened to the ground by the roller, while the opposite cutting margins of the same blades are moved to projected position ready to be brought to the ground to repeat the sliding and cutting action.

The roller 10 may be attached to a lawn mower as shown, or merely to a handle having end brackets receiving the journals of the roller. When the roller is rolled on the ground where are growing weeds to be cut, the roller rolls over the weeds, flattening them to the ground, whereupon the projected serrated margins 33 move to and against the weeds flat on the ground, and as the such margins are pushed by the weeds and ground into the roller, the teeth of adjacent margins cross each other and cut the weeds with a scissor's action.

Figs. 8 and 9 show a simplified roller 10' provided with a single longitudinal diametrical guide way 22' extending substantially through the axis of the roller to the periphery of the roller and to near ends of the roller and having closely spaced parallel side walls between which slide a single longitudinal blade 24' nearly as long as said guide way and of a width somewhat greater than the diameter of the roller, slidably disposed in the guide way and provided with unserrated cutting side edges 45', the blade being provided near the ends with diagonal slots 47 inclined in the same direction. A short shaft 49' passing through and projecting from each slot has projecting ends, the ground roller being provided with bores receiving said projecting ends. Anti-friction rollers 52 are rotary on each shaft in each associated slot 47 the length and width of the blade, the length and position of the slots and the position and size of the anti-friction rollers 52 being such that when the rollers are in either end of the slots, the adjacent cutting edges are housed in the associated guide way and the opposite cutting edges are projected.

The operation of the roller of Figs. 8 and 9 is similar to that of Figs. 1 to 7, except that the unserrated acting edge of the single blade of Figs. 8 and 9 merely moves transversely of the weed being cut and cuts the weed with a sliding or shearing action.

I claim as my invention:

1. A cutter comprising a roller provided with a longitudinal diametrical guide way extending substantially through the roller; a longitudinal blade of a width somewhat greater than the diameter of the roller, slidably disposed in the guide way and provided with cutting side edges and near the ends with diagonal slots inclined in the same direction; a short shaft passing through and projecting from each slot and having projecting ends, the roller being provided with bores receiving said projecting ends; and anti-friction rollers rotary on each shaft in each associated slot.

2. A cutter comprising a traveling structure having end brackets; a roller journaled in said brackets and provided with a longitudinal diametrical guide way extending substantially through the axis of the roller to the periphery of the roller and to near ends of the roller and having closely spaced parallel side walls; a longitudinal blade nearly as long as said guide way and of a width somewhat greater than the diameter of the roller, slidably disposed in the guide way and provided with cutting side edges and near the ends with diagonal slots inclined in the same direction; a short shaft passing through and projecting from each slot and having projecting ends, the roller being provided with bores receiving said projecting ends; and anti-friction rollers rotary on each shaft in each associated slot; the length and width of the blade, the length and position of the slots and the position and size of the anti-friction rollers being such that when the rollers are in either end of the slots, the adjacent cutting edges are housed in the associated guide way and the opposite cutting edges are projected.

3. A weed cutter comprising a roller having a diametrical guide way extending substantially through the axis of the roller to the periphery and to near the end part of the roller; pairs of longitudinal blades wider than the roller is thick and slidable face-to-face in the guide way and provided with serrated cutting side edges; the blades being provided with diagonal slots, the slots of each blade being inclined in the same direction; the slots of one blade being adjacent to and crossing the slots of the other blade; a shaft passing through each pair of crossed slots and having projecting ends; the roller being provided with bores receiving said ends; anti-friction rollers rotary on each short shaft, one in each associated slot and means for rolling the roller.

4. A weed cutter comprising a traveling structure having alined end brackets axially transverse to the path of the travel; a roller having end journals rotary on said brackets; said roller having intersecting longitudinal diametrical guide ways extending substantially through the axis of the roller to the periphery and to near the end parts of the roller; pairs of longitudinal blades wider than the roller is thick and slidable face-to-face in the respective guide ways and provided with serrated side edges and large intramarginal openings and wide webs therebetween passing through the oepnings of the other pair; non-adjacent webs of each blade being adjacent to webs of the same pair and provided with diagonal slots, the slots of each blade being inclined in the same direction; adjacent slots crossing each other and being inclined in opposite direction; a shaft passing through each pair of crossed slots and having projecting ends; bearing blocks fast in guide ways at said ends and provided with bores receiving said ends; and rollers rotary on each short shaft, one in each associated slot.

ERNEST SCHLUETER.

References Cited in the file of this patent

UNITED STATES PATENTS

| Number | Name | Date |
|---|---|---|
| 266,824 | Hurd | Oct. 31, 1882 |
| 942,376 | Clardy | Dec. 7, 1909 |
| 1,989,821 | Peterson | Feb. 5, 1935 |
| 2,124,934 | Urschel | July 26, 1938 |
| 2,422,942 | Wood | June 24, 1947 |

FOREIGN PATENTS

| Number | Country | Date |
|---|---|---|
| 109,047 | Germany | Mar. 12, 1900 |
| 356,821 | Germany | Mar. 27, 1921 |